(12) United States Patent
Fernandez de Mendiola Quintana et al.

(10) Patent No.: US 8,528,791 B2
(45) Date of Patent: Sep. 10, 2013

(54) CLOSURE DEVICE COMPRISING A MEASURING CAP, INTENDED TO BE CONNECTED TO A FLEXIBLE CONTAINER

(75) Inventors: Javier Fernandez de Mendiola Quintana, Vitoria (ES); Juan Ignacio Valpuesta Landa, Vitoria (ES); Christian Guillot, Maillat (FR)

(73) Assignee: CTL-TH Packaging, S.L. Unipersonal, Miriano (Alava) (ES)

( * ) Notice: Subject to any disclaimer, the term of this patent is extended or adjusted under 35 U.S.C. 154(b) by 141 days.

(21) Appl. No.: 13/057,887

(22) PCT Filed: Aug. 5, 2008

(86) PCT No.: PCT/ES2008/000544
§ 371 (c)(1),
(2), (4) Date: Jun. 28, 2011

(87) PCT Pub. No.: WO2010/018236
PCT Pub. Date: Feb. 18, 2010

(65) Prior Publication Data
US 2011/0248048 A1    Oct. 13, 2011

(51) Int. Cl.
*B65D 37/00* (2006.01)
(52) U.S. Cl.
USPC .......................................... 222/213

(58) Field of Classification Search
USPC .......... 222/546, 556, 207, 212–214, 519–521
See application file for complete search history.

(56) References Cited

U.S. PATENT DOCUMENTS

| 4,506,809 | A | * | 3/1985 | Corsette ..................... 222/213 |
| 5,224,632 | A | * | 7/1993 | Murakami et al. ............ 222/205 |
| 6,206,230 | B1 | | 3/2001 | Wan et al. |
| 2007/0017939 | A1 | | 1/2007 | Conroy et al. |

FOREIGN PATENT DOCUMENTS

| EP | 0267748 A2 | 5/1988 |
| GB | 2122586 A | 1/1984 |
| WO | WO 9519919 A1 | 7/1995 |
| WO | WO 9906801 A1 | 2/1999 |
| WO | WO 2007149419 A2 | 12/2007 |

* cited by examiner

*Primary Examiner* — Paul R Durand
*Assistant Examiner* — Randall Gruby
(74) *Attorney, Agent, or Firm* — Browdy and Neimark, PLLC

(57) ABSTRACT

A closure device to be connected to a container, which includes a cap, a moving shutter and a lid, where the moving shutter is housed in a compartment of the cap and presents a platform provided with holes, two elastically deformable tongues and a body with a cylindrical section held in place and guided by a chimney in the lid, where the lid includes a central hole that allows the product to exit. The moving shutter is operated by pressing on the elastic container, which allows a dose of the product to come out, the moving shutter then being returned to its rest position by the tongues.

5 Claims, 2 Drawing Sheets

SECCIÓN A    SECCIÓN B

CLOSURE DEVICE COMPRISING A MEASURING CAP, INTENDED TO BE CONNECTED TO A FLEXIBLE CONTAINER

TECHNICAL FIELD

The object of the invention is to provide a closure device comprising a measuring cap, intended to be connected to a flexible container of the type used in cosmetic product packaging, etc.

PRIOR ART

A wide number of dosing-provided distribution devices are known. These devices are usually formed by several constructive elements that are expensive to manufacture and assemble.

It must be taken into consideration that, of course, users of these devices usually do everything in their hand to attempt to reduce the total price of the packaging of the products they put on sale.

This invention therefore aims to provide a distribution device capable of providing a dose of cream-like product or similar product, where the distribution device, in comprising only three plastic component parts, can be manufactured and assembled in an automated manner at a low cost. This invention also aims to be capable of being connected to standard types of packaging.

Another aim of this invention is to provide a device that is easy and safe to operate and which is also easier to operate than known devices.

BRIEF DESCRIPTION OF THE INVENTION

It is an object of this invention to provide a closure device for its connection to a container, the device comprising a cap, a moving shutter and a lid, where the moving shutter is housed in a compartment of the cap and presents a platform provided with holes, two elastically deformable tongues and a body with a cylindrical section held in place and guided by a chimney in the lid, where the lid comprises a central hole that allows the product to exit. The moving shutter is operated by pressing on the elastic container, which allows a dose of the product to come out, the moving shutter then being returned to its rest position by the tongues.

Preferably, the container is a flexible tube or similar type of container that may hold different contents, the measuring cap being placed on the body of the flexible tube or similar type of container. The measuring cap and the flexible tube, once the latter has been filled, constitute an end product. Thanks to the invention, the user may obtain as many doses as they require simply by pressing on the flexible tube.

BRIEF DESCRIPTION OF THE FIGURES

The product-dosing distribution device is detailed in the following description, which refers to the accompanying figures showing the invention.

The first half (section A) shows an elevation of the device in a closed position.

The second half (section B) shows an elevation of the device on its support and in the rest position.

Figure 2:
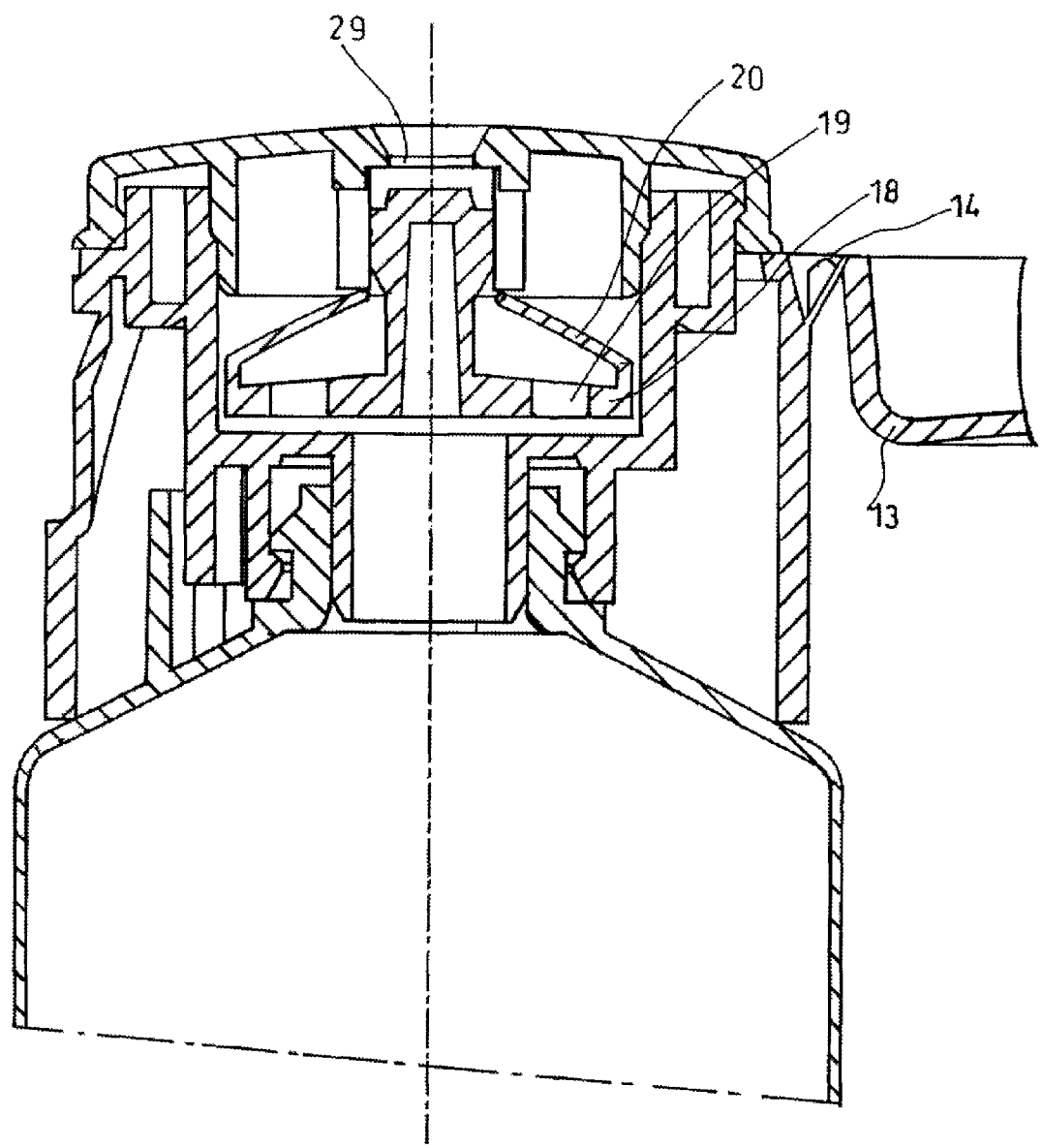

FIG. 2 shows the device at the start of its elevation for the provision of a dose of the product.

DETAILED DESCRIPTION OF THE INVENTION

In reference to these drawings, the component parts of the distribution device are preferably formed by a moulded plastic material such as polypropylene or polyacetal (which is also known as polyoxymethylene (POM) or polyformaldehyde), although this information is non-limiting.

The inventive device comprises:

A first fixed member referred to as measuring cap (2), mounted on a flexible container (1) provided with a neck (6). The measuring cap (2) comprises a compartment (3), which in this case is cylindrical, designed to receive a second member, a base (4) open at the centre, and a skirt (5), which in this case is cylindrical, designed to be connected in a sealed manner on the neck (6) of the container (1). In addition, the measuring cap (2) comprises a second skirt (7) provided with ring-shaped ribbing (8) that is embedded and exerts a force assisted by an outer peripheral projection (9) that projects out from the neck (6) of the container (1). The measuring cap (2) also comprises a wall (10) situated on the contour of the compartment (3), provided with projections (11) disposed at 120° in order to assist with the fixing of the third member. The measuring cap (2) also comprises a claw member (12) that is disposed on the outer base of the compartment (3), its function being to tighten the measuring cap (2) on the container (1). Finally, it also comprises closure means represented by a cover (13) with a hinge (14), provided in the centre with a fitting (15) designed to interlock in a sealed manner in a hole provided in the third member, said closure being guaranteed by a secure member (16) connected to a retractable strip that is not shown in the figures.

Figure 1:
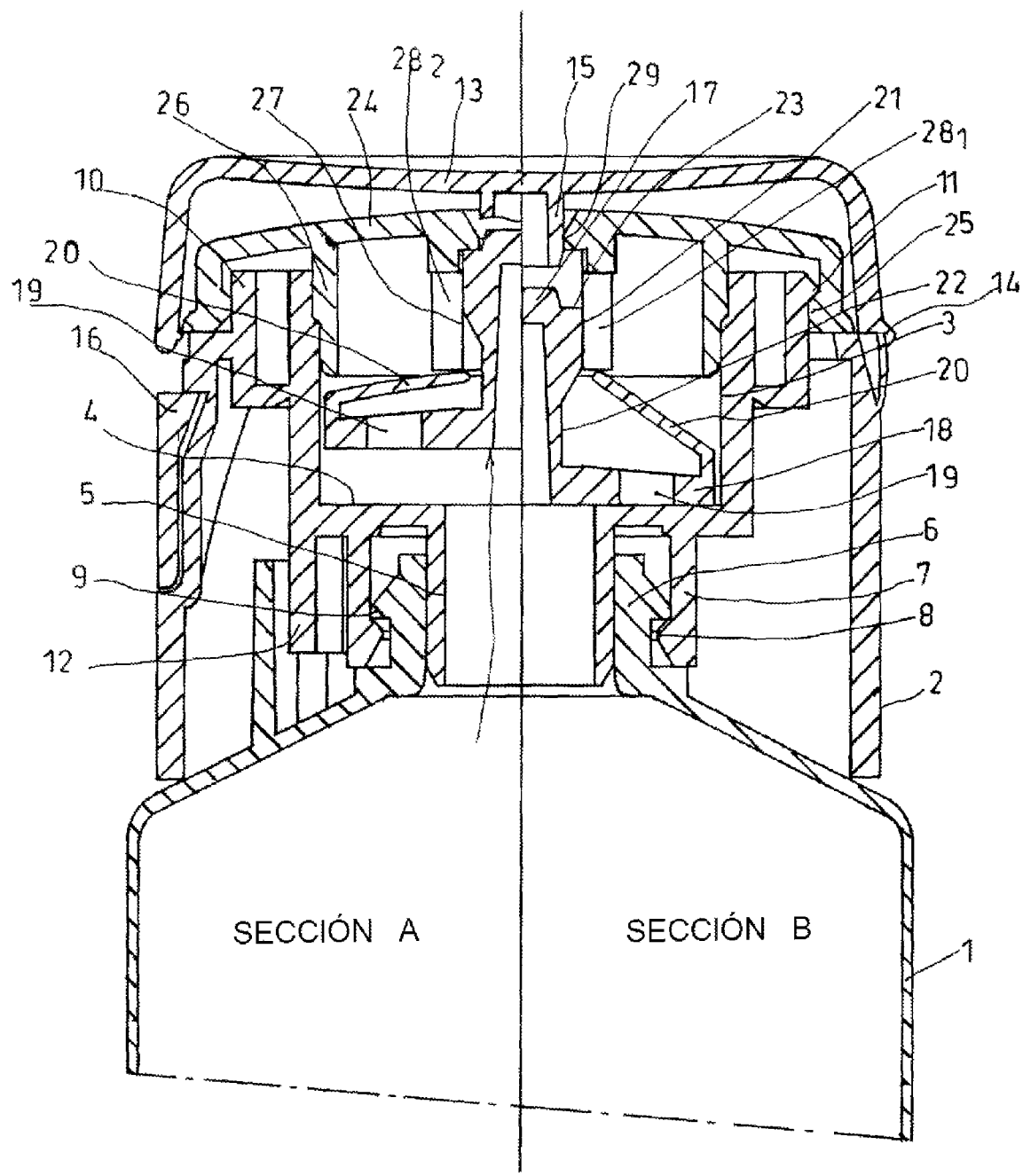
FIG. 1 shows the drawings of the two halves of the device of the invention.

A second member referred to as a moving shutter (17), shown in various positions in FIGS. 1 and 2, which comprises a platform (18), which in this case is cylindrical, in which holes (19) are disposed allowing the product to pass through. In addition, the moving shutter (17) comprises two elastically deformable bodies, represented by two tongues (20) that extend from the edge of said platform (18), which, when deformed, allow said shutter to move to its closed position; i.e., after allowing a dose of the product to come out as shown in section A of FIG. 1, by elastic effect said moving shutter (17) returns to its rest position shown in section B of FIG. 1. On the axis of the moving shutter (17) stands a cylindrical body with cylindrical sections (21, 22), the head of which is provided with a flat edge (23) that cooperates with the central hole of the third member. The smallest cylindrical section (22) corresponds to a free evacuation space that allows the tongues (20) to become deformed when they are operated, as shown in section A of FIG. 1.

A third member referred to as a lid (24), designed to be connected by means of clips to said measuring cap (2), which is provided with circular ribbing (25) that cooperates with the projections (11) disposed at 120° in the top part of the wall (10) of said measuring cap (2). In addition, the lid (24) comprises a skirt (26) designed to interlock in a sealed manner inside the compartment (3) of the measuring cap (2), a chimney (27), which in this case is cylindrical, provided with two longitudinal holes (28) disposed at 180° all the way along the wall, and a central hole (29) that allows the product to slide.

The inventive device works as follows:

Prior to its use, the measuring cap (2) is positioned beneath the container (1). From this relative position an initial application of pressure causes the compartment (3) of the measuring cap (2) to fill, the idea being to prime the dosing device. The moving shutter (17) is subjected to pressure, causing the tongues (20) to deform, which allows the moving shutter (17) to come away from its support, as shown in FIG. 2. As a result, the product is released through the holes (19) positioned in the platform (18). Eventually, the body with a cylindrical section (21, 22) slides through the pipe in the chimney (27), closing the longitudinal holes (28) of said pipe, as well as the central hole (29) in the lid, as shown in section A of FIG. 1. When the pressure exerted on the container (1) eases, the elastic effect of the tongues (20) causes the moving shutter (17) to return to its initial position, in which the moving shutter (17) returns to its position on the support, as shown in section B of FIG. 1. In other words, the moving shutter (17) returns to its non-active position, according to which the head of the body with a cylindrical section (21, 22) and a flat edge (23), which is disposed inside the chimney (27), once more opens two longitudinal holes (28) to allow the product to pass through. The product is kept inside the compartment (3) of the measuring cap (2), the dosing device thus being ready to be used in the manner explained above in order to release another dose of the product.

The invention claimed is:

1. Closure device, intended for a flexible container (1) capable of containing a cosmetic product in the form of a cream or similar product, comprising:
    a cap (2) intended to be mounted or fitted on the container (1), said cap (2) having an inner compartment (3) in communication with the inside of the container (1),
    a lid (24) that closes the compartment (3), said lid (24) being provided with a chimney (27) and a central hole (29), said hole (29) being in communication with the compartment (3) in order to allow the product to pass or slide through,
    a moving shutter (17) housed in the compartment (3) and kept inside the compartment (3) by the lid (24), the shutter (17) being elastically biased so to close communication between the compartment (3) and the inside of the container (1), wherein
    the shutter (17) is capable of moving axially, of opening communication between the compartment (3) and the inside of the container (1), and of eventually closing the central hole (29) of the lid (24), when sufficient pressure is exerted on the container (1) and the product housed in the container (1) is pushed towards the compartment (3) pushing said shutter (17), where
    the cap (2) comprises a cover (13) with a hinge (14), said cover (13) being provided in its central area with a fitting (15) designed to be fitted in a sealed manner inside the central hole (29) positioned in the lid (24), said closure being guaranteed by means of a secure member (16).

2. Closure device according to claim 1, wherein the cap (2) comprises a base (4) with a mouth extended by a skirt (5) intended to be connected in a sealed manner on a neck (6) of the container (1), a second skirt (7) provided with ring-shaped ribbing (8) that is fitted by means of force to cooperate with an outer peripheral projection (9) situated in said neck (6) of the container (1), a wall (10) situated on the compartment (3), provided with projections (11) intended to allow the fixing of the lid (24).

3. Closure device according to claim 2, wherein the lid (24) is clipped to the cap (2) by means of circular ribbing (25) that cooperates with the projections (11) of the cap (2), and wherein the lid (24) comprises a skirt (26) intended to interlock in a sealed manner inside the compartment (3) of the cap (2).

4. Closure device according to claim 1, wherein the moving shutter (17) comprises a cylindrical platform in which holes (19) are disposed that allow the product to pass through, a cylindrical body that presents two cylindrical sections (21, 22) and whose head is provided with a flat edge (23) that allows the closure of the central hole (29) of the lid (24), and at least two tongues (20) that extend from the edge of the platform (18) and which, due to their elastic effect, allow the moving shutter (17) to return from a closing position in the central hole (29) to its rest position after allowing a dose of the product to come out.

5. Closure device, intended for a flexible container (1) capable of containing a cosmetic product in the form of a cream or similar product, comprising:
    a cap (2) intended to be mounted or fitted on the container (1), said cap (2) having an inner compartment (3) in communication with the inside of the container (1),
    a lid (24) that closes the compartment (3), said lid (24) being provided with a chimney (27) and a central hole (29), said hole (29) being in communication with the compartment (3) in order to allow the product to pass or slide through,
    a moving shutter (17) housed in the compartment (3) and kept inside the compartment (3) by the lid (24), the shutter (17) being elastically biased so to close communication between the compartment (3) and the inside of the container (1), wherein
    the shutter (17) is capable of moving axially, of opening communication between the compartment (3) and the inside of the container (1), and of eventually closing the central hole (29) of the lid (24), when sufficient pressure is exerted on the container (1) and the product housed in the container (1) is pushed towards the compartment (3) pushing said shutter (17), where
    the cap (2) comprises a cover (13) with a hinge (14), said cover (13) being provided in its central area with a fitting (15) designed to be fitted in a sealed manner inside the central hole (29) positioned in the lid (24), said closure being guaranteed by means of a secure member (16),
    wherein the cap (2) comprises a base (4) with a mouth extended by a skirt (5) intended to be connected in a sealed manner on a neck (6) of the container (1), a second skirt (7) provided with ring-shaped ribbing (8) that is fitted by means of force to cooperate with an outer peripheral projection (9) situated in said neck (6) of the container (1), a wall (10) situated on the compartment (3), provided with projections (11) intended to allow the fixing of the lid (24), and
    wherein the moving shutter (17) comprises a cylindrical platform in which holes (19) are disposed that allow the product to pass through, a cylindrical body that presents two cylindrical sections (21, 22) and whose head is provided with a flat edge (23) that allows the closure of the central hole (29) of the lid (24), and at least two tongues (20) that extend from the edge of the platform (18) and which, due to their elastic effect, allow the moving shutter (17) to return from a closing position in the central hole (29) to its rest position after allowing a dose of the product to come out.

* * * * *

UNITED STATES PATENT AND TRADEMARK OFFICE
CERTIFICATE OF CORRECTION

PATENT NO. : 8,528,791 B2
APPLICATION NO. : 13/057887
DATED : September 10, 2013
INVENTOR(S) : Javier Fernandez De Mendiola Quintana It is certified that error appears in the above-identified patent and that said Letters Patent is hereby corrected as shown below:

On the Title Page

At Item (73) Assignee, correct the incorrect assignee's address by deleting "Miriano (Alava) ES" and insert --Miñano (Alava) ES--.

Signed and Sealed this
First Day of July, 2014

Michelle K. Lee
*Deputy Director of the United States Patent and Trademark Office*